L. C. Reese.
Harvester Rake.
No. 2456 Reissued Jan. 15, 1867.
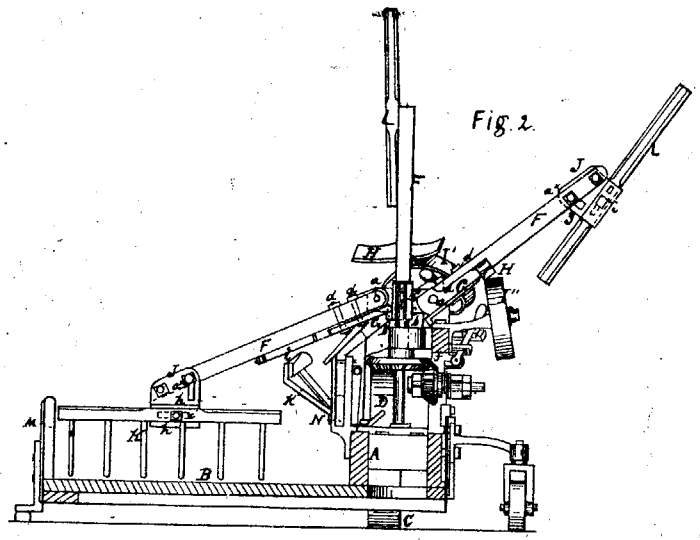
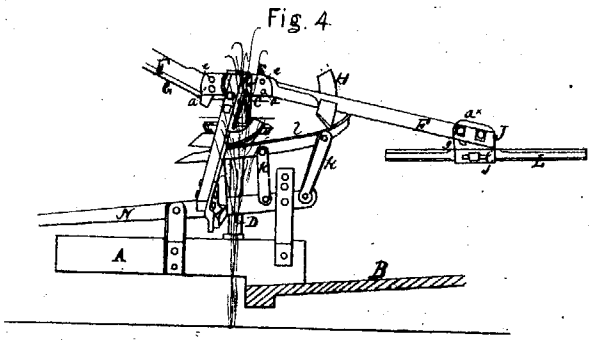
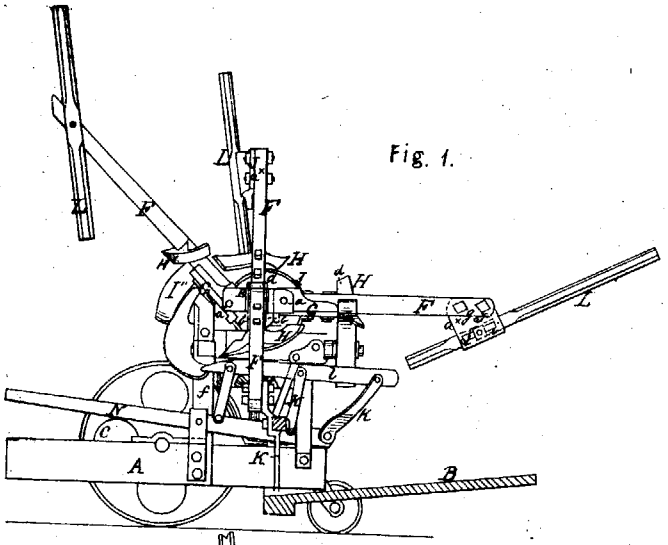
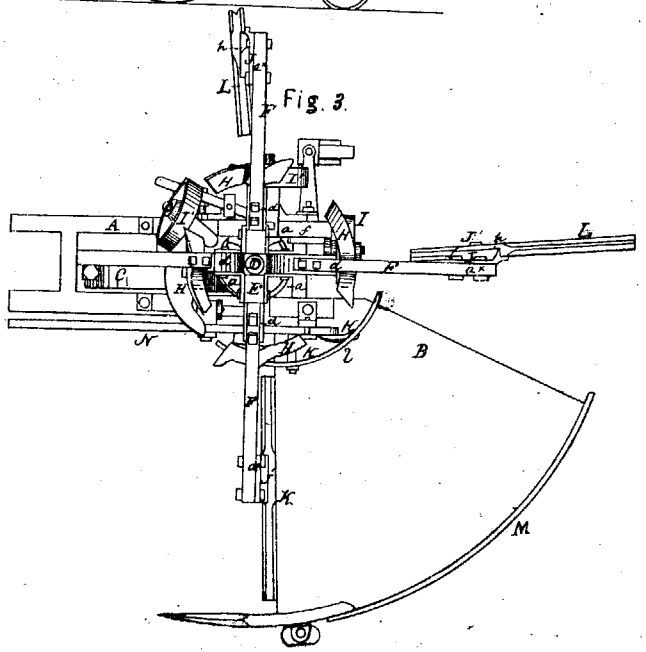

UNITED STATES PATENT OFFICE.

LEWIS C. REESE, OF PHILLIPSBURG, NEW JERSEY, ASSIGNEE OF THOMAS S. WHITENACK.

IMPROVEMENT IN RAKES FOR HARVESTERS.

Specification forming part of Letters Patent No. 341, dated February 5, 1861; reissue No. 2,456, dated January 15, 1867.

*To all whom it may concern:*

Be it known that T. S. WHITENACK, of Easton, in the county of Northampton and State of Pennsylvania, did invent a new and Improved Raking Device for Harvesters; and that the following is a full, clear, and exact description of the same, reference being had to the annexed drawings, making a part of this specification, in which—

Figure 1 is a side sectional view of the invention, taken in the line *x x*, Fig. 3; Fig. 2, a back sectional view of ditto, taken in the line *y y*, Fig. 3; Fig. 3, a plan or top view of ditto; Fig. 4, a side sectional view of ditto, taken in the same line as Fig. 1, but showing a different arrangement of the parts.

Similar letters of reference indicate corresponding parts in the several figures.

This invention relates to certain improvements in that class of raking attachments for harvesters in which the rake and beaters, in passing over the platform, describe the arc of a circle in a horizontal plane. The object of the within-described invention is to apply this class of raking devices to the machine in such a way as to admit of the use of a driver's seat on the machine, and also to admit of the regulating of the rake and beaters as regards the height of their movement over the platform, and the perfect adaptation of the former to the latter, as circumstances may require.

To enable those skilled in the art to fully understand and construct the invention, I will proceed to describe it.

A represents the main frame of the machine, which may be constructed in any proper way, and B is a platform, which is of a sector form, and secured to the back part of the main frame; and D is a vertical shaft, which is placed in the main frame, and is rotated by suitable gearing or belts—either or both—from the driving-wheel. On the upper end of the shaft D there is placed or secured a metallic head or socket, E, provided with radial recesses to receive the ends of arms F, which are secured in the head by pins *a*, the arms being allowed to work or to rise and fall in vertical planes on their pins *a*.

To the under side of each arm F, at its inner part, there is attached a slide, G. These slides have their inner ends bent or curved down, as shown at *b*, to form bearing-surfaces for the arms, the ends *b* resting against the lower part *c* of the head or socket E, as shown clearly in Fig. 2. The slides G may be secured at any desired point by bolts *d*, and the adjustment of the slides G prevents them from descending below a certain height, which may be made greater or less. This adjustment of the arms F may also be regulated by passing the pins *a* through the arms *f* at higher or lower points, two or more holes, *e*, being made for the reception of each pin *a*, either hole being used, as desired. (See Fig. 4.) To each arm F there is attached transversely a shoe, *h*. These shoes are curved upward at their front ends, and work over rollers I I′ I″, which are attached to a suitable framing, *f*, on the main frame A. The roller I, it will be seen, is in a vertical position, the roller I′ is slightly inclined, and the roller I″ inclined in a greater degree.

The rollers I I′ I″ elevate the arms F as they rotate, and, after leaving the platform B and the roller I″, incline the arms as they pass around over the front part of the main frame, so that the driver's seat may be placed thereon, and the rake and beaters made to clear the driver. This result, so far as I am aware, is not obtained by other raking attachments of the class to which this invention relates.

To the outer end of each arm F there is attached a metal socket, J, which receives the rake K and beaters L. The rake K may be constructed in the usual or in any proper way, and the beaters L are simply bars of straight form. The sockets J may be described as being formed each of a flat plate, *a**, having two holes made through it, one, *g*, of which is curved and of sufficient length to admit of a vertical adjustment of the plate. (See Figs. 2 and 4.)

At the lower part of the plate there are two flanges, *h h*, between which the beaters L are placed and secured by a bolt, *t*, the latter passing through oblong slots *j*. (See Fig. 4.) The flanges *h h* have a position somewhat oblique with the plates, the obliquity being such that the beaters L and rake K will have a position in the same plane with the front end of the platform as they commence to pass over it. (See Fig. 3.) This is important, for if the beaters which serve the purpose of a reel do not act upon the standing grain in the same plane with the front edge of the platform, their action will be imperfect. The arms F are made to pass over the platform B, or in a horizontal position, by adjusting the plates *a** of the sockets J, the holes or slots *g* of each plate admitting of such adjustment.

The adjustment of the arms F of the beaters is necessary, in order that the beaters be adjusted to strike the grain higher or lower, according to the height of the latter, for if tall grain be struck by the beaters at a low point, the beaters will have a tendency to throw the top of the grain backward, off from, instead of on or toward, the platform.

This difference in the height of the beaters L involves the necessity of a longitudinal adjustment of the beaters, in order that the outer ends of the latter may pass within the guard M of the platform B at all points of their adjustment. The longitudinal adjustment of the beaters L is effected by means of the slots *j* through which the bolts *i* pass.

To the inner side of the main frame A there is attached a lever, N, the back end of which has uprights *k* secured to it, which support a curved bar, *l*, over which the arms F rotate. The driver at any time, by depressing the front end of lever N, and thereby elevating its back end and bar *l*, will cause the beaters and rake to pass over the platform at a considerable elevation, so as to be inoperative so far as any action on the grain is concerned. This is important, for in certain cases where the grain is light it may be only necessary for the rake to sweep the platform and rake the grain therefrom at every alternate revolution only. The rake K, it will be understood, may be adjusted in precisely the same way as the beaters.

Having thus described the invention of said THOMAS S. WHITENACK, what is claimed, and desired to secure by Letters Patent, is—

1. Constructing and arranging the raking and reeling apparatus in such a manner that the rake may act as a reeling apparatus, and at the will of the operator the raking-teeth may be kept above the platform, so as not to sweep the grain from the platform.

2. A combination of a revolving rake on an axis vertical, or nearly so, and an unobstructed space for the driver to sit on the machine.

3. The combination of a continuously-revolving rake, whose arm is pivoted to an axis vertically, or nearly so, and an unobstructed space for the driver to sit on the main frame.

4. The employment or use of the slides G, when applied to the arms F, substantially as shown, for the adjustment of the same, as set forth.

5. The rollers I I′ I″, when applied to the main frame A, and used in connection with the arms F, to operate as and for the purpose set forth.

6. Attaching the beaters L and rake K to the arms F by means of the sockets J, constructed and arranged as shown, to admit of the adjustment of the beaters and rake specifically, as set forth.

7. In combination with the arms F, the lever N, attached to the main frame A, and provided with the curved bar *l*, placed in such relation with the arms to operate as and for the purpose set forth.

LEWIS C. REESE.

Witnesses:
WM. M. PATTERSON,
A. P. TEEL.